United States Patent [19]
Yamamuro

[11] Patent Number: 5,128,920
[45] Date of Patent: Jul. 7, 1992

[54] OPTICAL DISK APPARATUS WITH A LASER BEAM CONTROLLABLE IN ACCORDANCE WITH A SPECIFICATION AREA ON A DISK

[75] Inventor: Mikio Yamamuro, Kawasaki, Japan

[73] Assignee: Kabushiki Kaisha Toshiba, Kawasaki, Japan

[21] Appl. No.: 343,306

[22] Filed: Apr. 26, 1989

[30] Foreign Application Priority Data

| Apr. 27, 1988 | [JP] | Japan | 63-104866 |
| Apr. 27, 1988 | [JP] | Japan | 63-104868 |
| Apr. 27, 1988 | [JP] | Japan | 63-104869 |

[51] Int. Cl.⁵ .............. G11B 20/18; G11B 27/36; G11B 7/00
[52] U.S. Cl. .............. 369/116; 369/54; 369/58; 369/100
[58] Field of Search .......... 369/59, 124, 58, 44.27, 369/32, 54, 100, 116

[56] References Cited

U.S. PATENT DOCUMENTS

| 4,642,803 | 2/1987 | Drexler | 369/58 |
| 4,792,933 | 12/1988 | Suzuki | 369/32 |
| 4,870,633 | 9/1989 | Matsushita et al. | 369/47 |
| 4,890,274 | 12/1989 | Kaneko et al. | 369/45 |
| 4,961,182 | 10/1990 | Saito et al. | 369/124 |
| 4,965,692 | 10/1990 | Tanaka et al. | 360/132 |
| 4,972,399 | 9/1988 | Miyasaka | 369/44.27 |

FOREIGN PATENT DOCUMENTS

| 82110852.9 | 6/1983 | European Pat. Off. |
| 87300789.2 | 8/1987 | European Pat. Off. |
| 61-39236 | 2/1986 | Japan | 369/124 |

OTHER PUBLICATIONS

Translation, German Patent Office Action for application Ser. No. p 39 13 992.1-53, dated Dec. 20, 1989.

Primary Examiner—Aristotelis Psitos
Assistant Examiner—Jefferson Evans
Attorney, Agent, or Firm—Finnegan, Henderson, Farabow, Garrett and Dunner

[57] ABSTRACT

An optical disk apparatus for reproducing data from an optical disk having recording tracks emits a laser beam onto the optical disk and converts a reflection beam into an electric signal by an optical head. This electric signal is amplified by an amplifier. The amplifier signal is extracted by the envelope detector. The envelope signal is extracted in accordance with the amplified signal. The envelope signal is added with the amplified signal from the amplifier, and the resultant signal is converted into a binary signal by binary circuit.

3 Claims, 11 Drawing Sheets

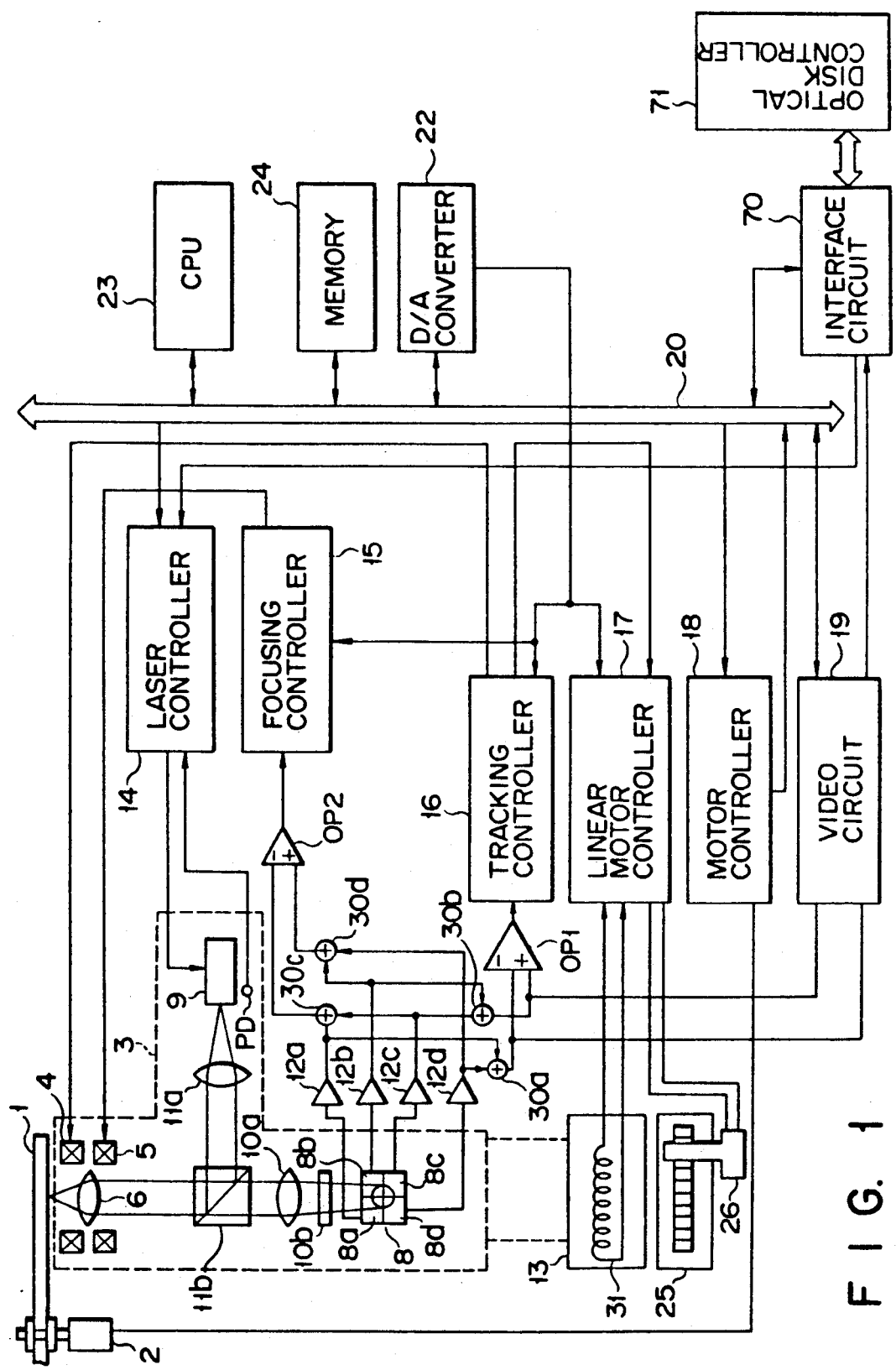
F I G. 1

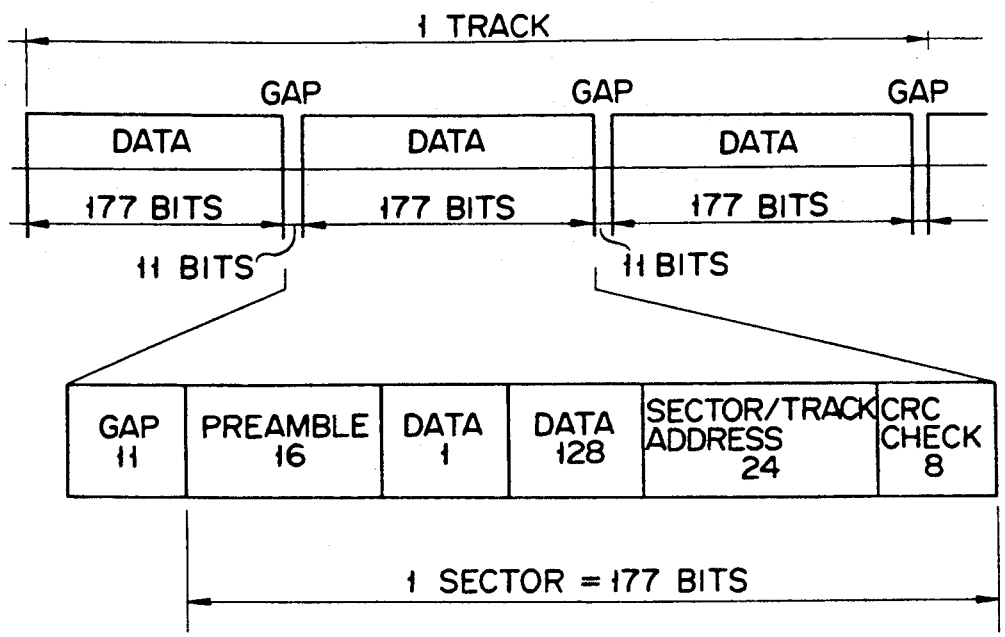
F I G. 4
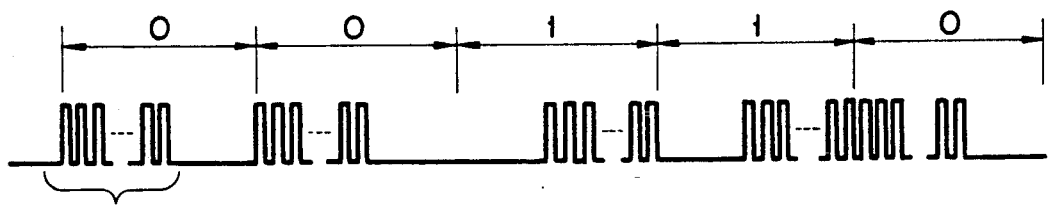
F I G. 5
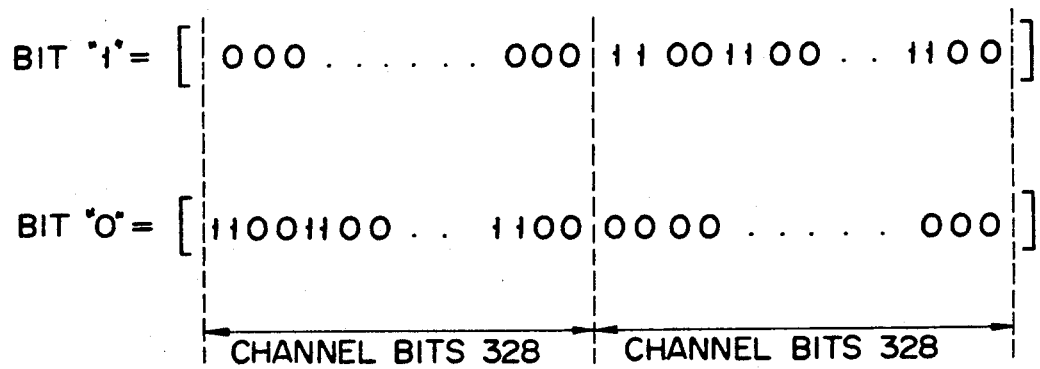
F I G. 6

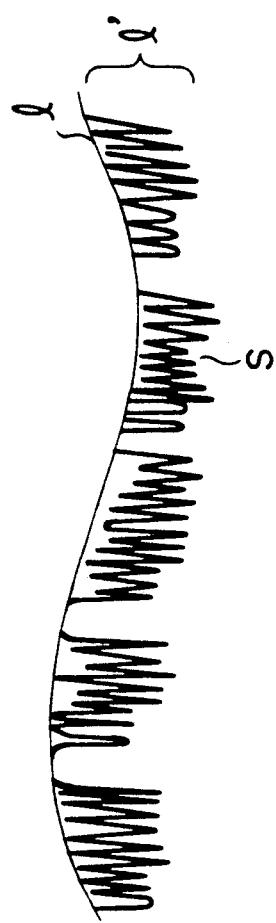
FIG. 9A  OUTPUT SIGNAL a OF ADDER CIRCUIT
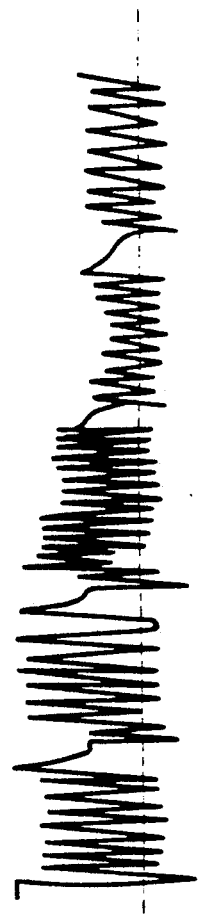
FIG. 9B  OUTPUT SIGNAL b OF AMPLIFIER 42
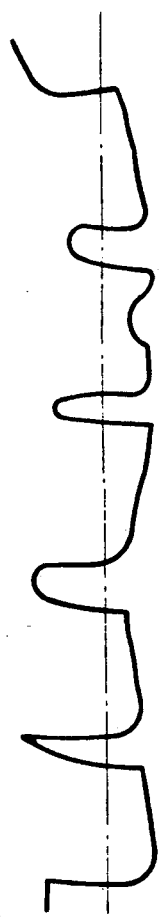
FIG. 9C  ENVELOPE DETECTION SIGNAL c
FIG. 9D  OUTPUT SIGNAL d OF COMPARATOR 46

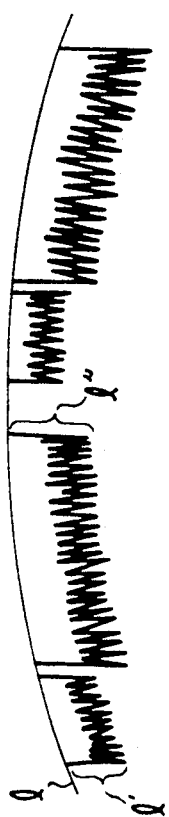
FIG. 10A  OUTPUT SIGNAL a OF ADDER CIRCUIT
FIG. 10B  SWITCH SIGNAL TO POWER SOURCE
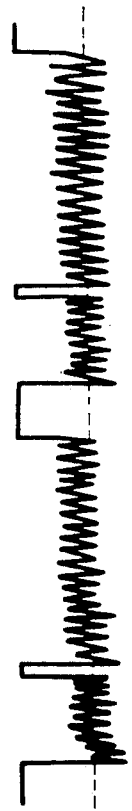
FIG. 10C  OUTPUT SIGNAL b OF AMPLIFIER 42
FIG. 10D  ENVELOPE DETECTION SIGNAL c
FIG. 10E  OUTPUT SIGNAL d OF COMPARATOR FIG. 11A OUTPUT SIGNAL a OF ADDER CIRCUIT 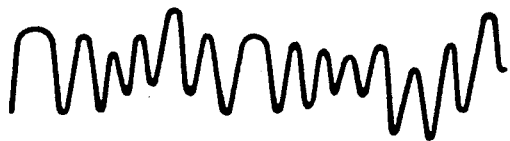
FIG. 11B OUTPUT SIGNAL b OF AMPLIFIER 42 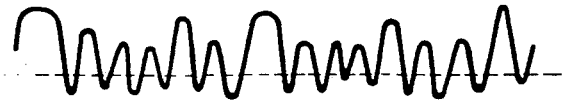
FIG. 11C ENVELOPE DETECTION SIGNAL d 

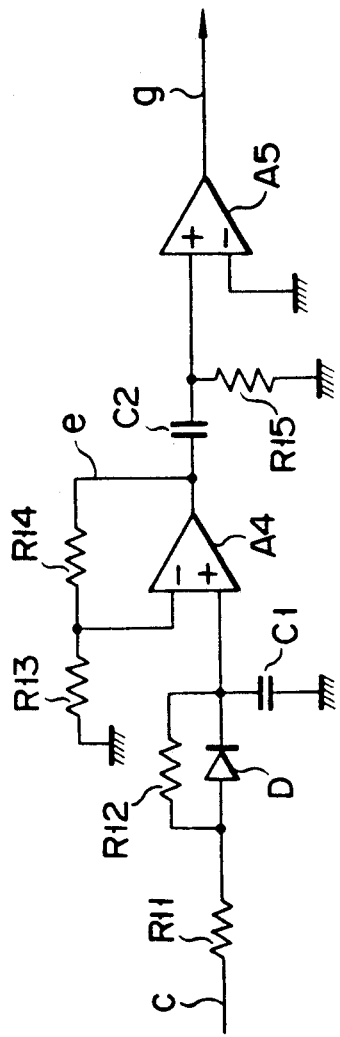
FIG. 13
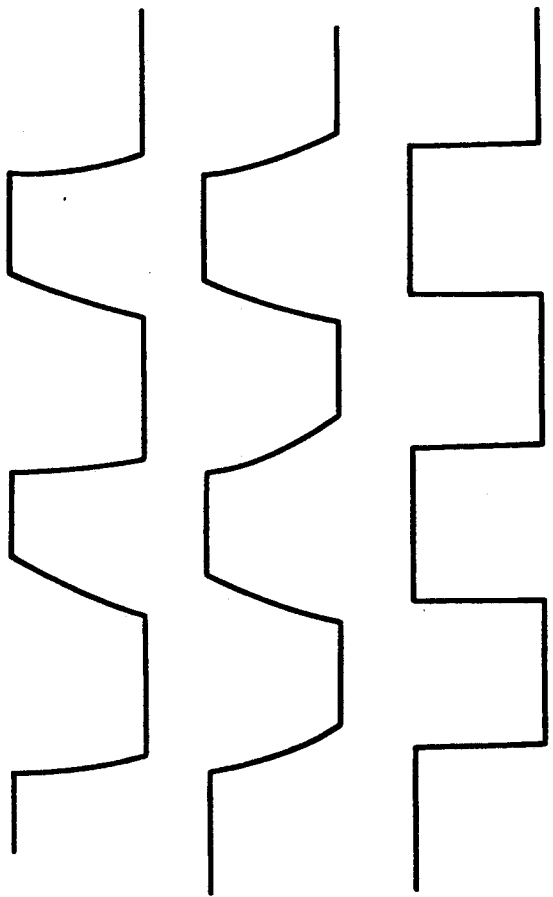
FIG. 14A ENVELOPE DETECTION SIGNAL c
FIG. 14B OUTPUT SIGNAL e OF AMPLIFIER A4
FIG. 14C ENVELOPE BINARY SIGNAL g

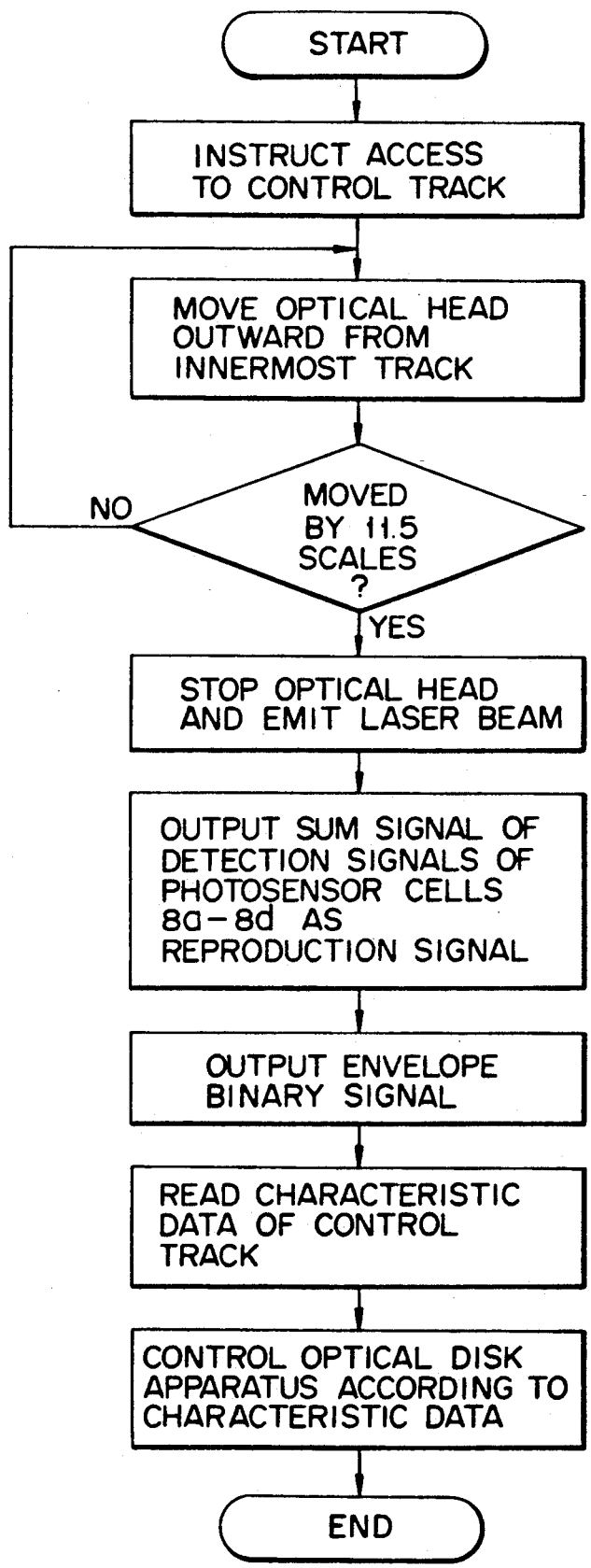
F I G. 15

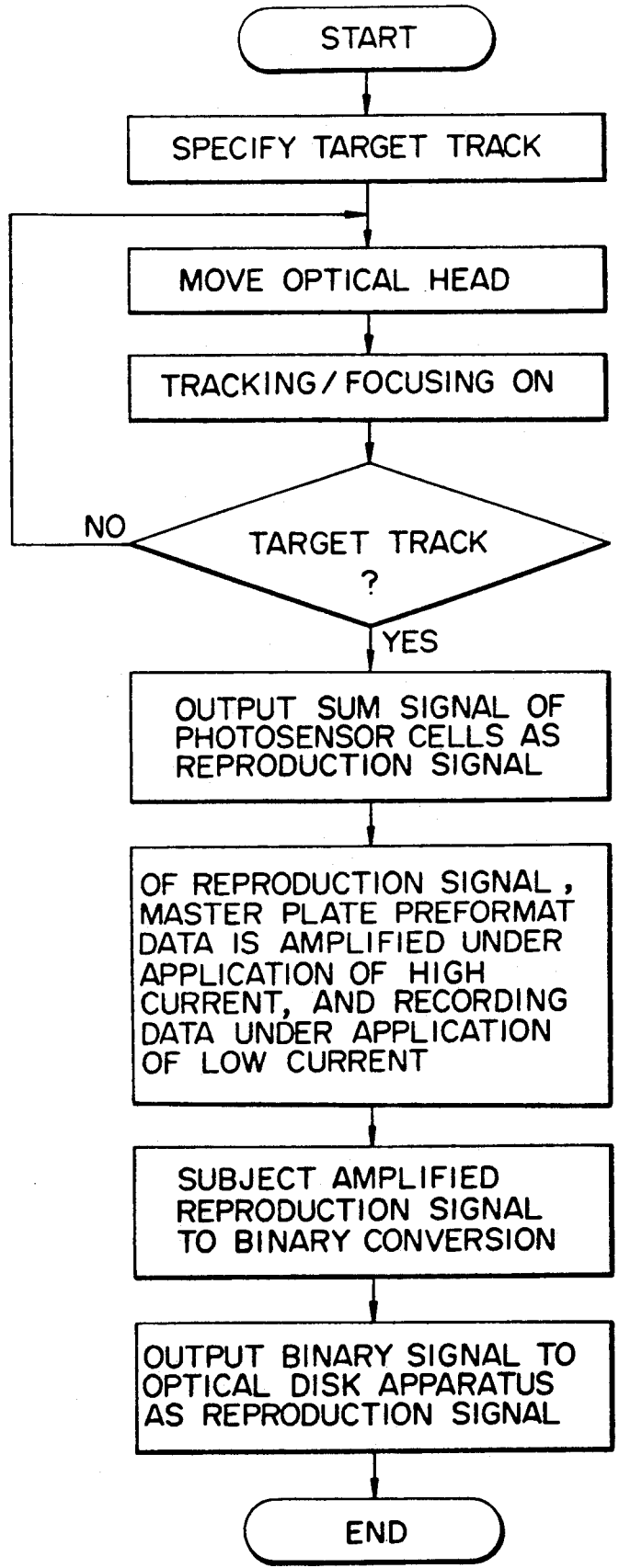
F I G. 16

OPTICAL DISK APPARATUS WITH A LASER BEAM CONTROLLABLE IN ACCORDANCE WITH A SPECIFICATION AREA ON A DISK

BACKGROUND OF THE INVENTION

1. Field of the Invention

The present invention generally relates to an optical disk apparatus, and more particularly, to an optical disk apparatus which rotates an optical disk relative to an optical head for optically recording data on tracks formed on the optical disk or optically reproducing recorded data therefrom.

2. Description of the Related Art

An image filing system uses an optical disk apparatus which rotates an optical disk having a number of spiral or concentric tracks formed on its surface for optical data recording on the tracks or optical data reproducing therefrom.

An original is two-dimensionally scanned with light to photoelectrically convert image data of the original into electric image data, which is then optically recorded on the tracks on the optical disk by an optical head. At the time of data retrieval, the recorded data is searched and retrieved by the optical head and is reproduced as a hard copy or soft copy.

For disk standardization, some optical disks have characteristic data or a control track recorded thereon as mode data varying for different manufacturers. This control track is recorded in a characteristic data recording area provided inward of a data recording area, the former area serving for recording characteristic data and the latter for recording data. Mode data representing by which manufacturer each optical disk is manufactured, is recorded on the control track in a bar code in conformity with the specification. Each bar of the bar code is formed in a block consisting of a plurality of bits. The control track bears several data about the characteristic of the optical disk, such as the reflection factor of the coating layer, the laser power for data writing, the laser power for data readout and the number of sectors per track, which are all used to determine the read/write mode (specification).

Although provision of the control track is considered, no consideration has been given as to how to accurately read out the recorded data from the control track. This raises a shortcoming such that the control track (characteristic data) cannot be accurately read out from the characteristic data recording area.

Further, according to the optical disk apparatus, to reproduce recorded data from an optical disk, a signal from an optical head is differentiated using an integral circuit consisting of a capacitor and a resistor, the differentiated signal is amplified by an amplifier and the amplified signal is converted into a binary signal by a binary circuit.

With the use of such an optical disk apparatus, however, due to data defect originated from a variation in recorded state of data or the like, the signal from the optical head may have an area where its amplitude is lower than what it should be, and the signal as a whole is likely to swell because of surface fluttering, eccentricity (deformation) or the like of an optical disk. This cannot ensure the signal from the optical head to have a constant level for its stable binary conversion, and cannot therefore achieve accurate data reproduction from the optical disk.

Furthermore, the master plate preformat data recorded on an optical disk at the time the master plate is manufactured is of a different type from that of data which is to be recorded on this optical disk by the aforementioned optical disk apparatus. The preformat data is recorded at the same time recording tracks are provided on the master plate by a stamper and includes address data.

The signals from the optical head which are respectively associated with the preformat data and data recorded on the optical disk have different amplitudes. If the preformat data and the recorded data are subjected to binary conversion with respect to the same detection level, a transient phenomena originating from the difference in amplitude becomes large and a stable reproduction signal may not be attained. This results in unstable binary conversion and inaccurate data reproduction.

SUMMARY OF THE INVENTION

Accordingly, it is an object of this invention to provide an optical disk apparatus which can ensure accurate reading of characteristic data from a characteristic data recording area.

It is another object of this invention to provide an optical disk apparatus which can ensure stable binary conversion of data and accurate data reproduction.

It is a further object of this invention to provide an optical disk apparatus which can suppress a transient phenomena originating from the difference in amplitude between signals associated with preformat data and data to be recorded at the time these two types of data are converted into binary data with respect to the same detection level, and can therefore attain stable reproduction signals to thereby accurately reproduce the preformat data and the recorded data.

According to one aspect of this invention, there is provided an optical disk apparatus for reproducing data from an optical disk having recording tracks by means of a laser beam, said apparatus comprising:
- optical head means for converting optical data attained by irradiating the laser beam on said optical disk into an electric signal;
- means for amplifying said electric signal from said optical head means;
- means for extracting an envelope signal in response to an amplified signal from said amplifier means;
- means for adding the envelope signal from said envelope signal extraction means and said electric signal from said optical head means to output an added signal; and
- means for converting the added signal from said adder means into a binary signal.

According to another aspect of this invention, there is provided an optical disk apparatus for reproducing information data and characteristic data for representing the type of an optical disk from the optical disk by means of a laser beam, the optical disk having an information data recording area in which the information data is to be recorded and a characteristic data recording area having the characteristic data recorded therein, said apparatus comprising:
- optical head means for converting optical data attained by the laser beam irradiated on the optical disk into an electric signal;
- means for moving said optical head means to said characteristic data recording area of the optical disk;

means for extracting an envelope signal in response to said electric signal from said optical head means at a time said optical head means is moved to said characteristic data recording area by said means; and converter means for converting said envelope signal into a binary signal at a time said optical head means is moved to said characteristic data recording area by said means.

According to a further aspect of this invention, there is provided an optical disk apparatus for reproducing data from an optical disk by means of a laser beam, the optical disk having recording tracks on which preformat data and recording data are recorded, said apparatus comprising:

optical head means for converting optical data attained by irradiating a laser beam on said optical disk into an electric signal;

means for generating two bias currents;

means for switching the two bias currents from said current generator means from each other at a time of reproduction of said preformat data or said recording data;

means for amplifying said electric signal from said optical head with an amplification factor according to that bias current which is switched by said switch means and generated from said current generator means;

means for extracting an envelope signal in response to an amplified signal from said amplifier means;

means for adding the envelope signal from said envelope signal extraction means and the amplified signal from said amplifier means to output an added signal; and means for converting the added signal from said adder means into a binary signal.

BRIEF DESCRIPTION OF THE DRAWINGS

FIG. 1 is a schematic block diagram illustrating an optical disk apparatus according to one embodiment of this invention;

FIG. 4 is a diagram illustrating the format of a control track on the optical disk shown in FIG. 1;

FIGS. 5 and 6 are diagrams illustrating the structure of one bit on the control track on the optical disk shown in FIG. 1;

FIGS. 9A, 9B, 9C, 9D, 10A, 10B, 10C, 10D, 10E, 11A, 11B and 11C are signal waveform diagrams illustrating signal waveforms at individual sections in a video circuit shown in FIG. 1;

FIG. 13 is a diagram illustrating the structure of an envelope binary circuit according to another embodiment of this invention;

FIGS. 14A, 14B and 14C are diagrams illustrating the waveforms of the signals generated in the various sections of the envelope binary circuit shown in FIG. 13;

FIG. 15 is a flowchart for explaining an operation for reading data from the control track; and FIG. 16 is a flowchart for explaining a reproduction operation.

DETAILED DESCRIPTION OF THE PREFERRED EMBODIMENTS

Preferred embodiments of this invention will now be described referring to the accompanying drawings.

FIG. 1 schematically illustrates an optical disk apparatus according to one embodiment of this invention.

An optical disk 1 shown in FIG. 1 has spiral or concentric grooves (tracks) formed in its surface. This optical disk 1 is rotated at, for example, a constant speed (e.g., 1800 rpm) by a motor 2 under the control of a motor controller 18.

Figure 3A:
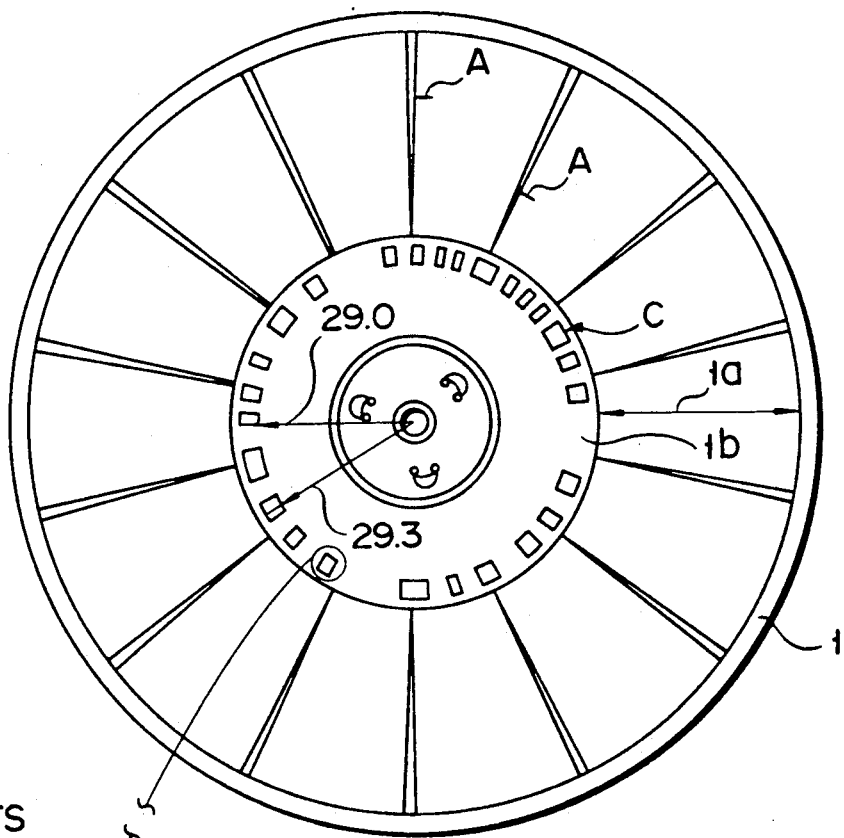
FIG. 3A is a plan view illustrating a data recording area on an optical disk shown in FIG. 1.

As shown in FIG. 3A, the optical disk 1, having a diameter of, for example, 5.25 inches (about 13.3 cm), comprises a glass or plastic, disk-shaped substrate and a metal coating layer or a recording film, which is coated on the substrate in doughnut shape and is composed of tellurium or bismuth.

Further, the optical disk 1 includes a data recording area 1a having tracks formed therein and a characteristic data recording area 1b provided inward of the former area 1a and having no guide groove (see FIG. 3A).

The data recording area 1a is divided into a plurality of sectors with a reference mark being a reference point. Data with a variable length is recorded over a plurality of blocks on the optical disk 1, 300,000 blocks being formed on 36,000 tracks on the optical disk 1.

The data recording area 1a has a block header A recorded therein as master plate preformat data at the time the optical disk is manufactured. This block header A is recorded at the beginning or head position of a block (unit of data recording) and includes a block number, a track number.

The characteristic data recording area 1b has a control track C already recorded at the time the optical disk is manufactured. The same characteristic data is recorded three times per rotation and it includes data about the characteristic (reflection factor) of the optical disk 1, the powers of a semiconductor laser required for data recording and data reproduction and the format (the number of sectors).

Figure 3B:
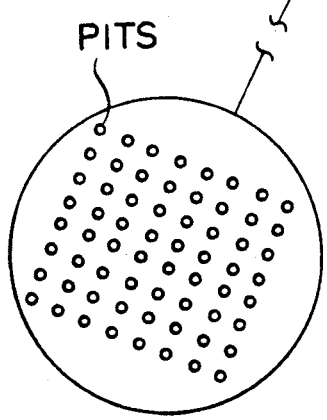
FIG. 3B is a plan view illustrating a characteristic data recording area on an optical disk shown in FIG. 1.

As shown in FIG. 3B, the control track C represents data by consecutive or non-consecutive pit rows and is recorded in the radial direction of the optical disk 1, its recording position being defined by the distance (radial position) from the center of the optical disk 1. For instance, the control track C is recorded on a region lying between the radiuses of 29.0 mm and 29.3 mm.

As shown in FIG. 4, the control track C consists of three sectors each including a gap, a preamble, a sync signal, characteristic data, sector/track address data, CRC check data, etc.

As shown in FIG. 5, when consecutive 82 pits exist at the first half of data of the control track C, one bit of the data is considered to be "0," and when such pits exist at the second half of the data, one bit of the data is considered to be "1."

Further, as shown in FIG. 6, when a plurality of pit rows exist in the first 328 channel bits of data in the control track C, one bit of the data is considered to be "0," and when a plurality of pit rows exist in the second 328 channel bits, one bit of the data is considered to be "1."

An optical head 3 is placed under and close to the optical disk 1. The optical head 3, comprises an objective lens 6, drive coils 4 and 5 for driving the lens 6, photosensor 8, a semiconductor laser 9, condensing lens 10a, cylindrical lens 10b, collimator lens 11a for collimating laser beams emitted by the semiconductor laser 9, half prisms 11b, and a light receiving element PD for detecting the amount of light from the semiconductor laser 9.

The objective lens 6 is suspended from a fixed section (not shown) of the optical head 3 by a wire or a leaf spring (not shown). This objective lens 6 is movable in the focusing direction (the direction of the optical axis of the lens) when driven by the drive coil 5, and it is movable in the tracking direction (perpendicular to the optical axis of the lens 6) when driven by the drive coil 4.

The optical head 3 is secured to a drive coil 13 serving as a movable section of a linear motor 31, which is coupled to a linear motor controller 17. The linear motor controller 17 is coupled to a linear motor position detector 26, which detects the position of an optical scale 25 provided at the optical head 3 and outputs a position signal.

The linear motor 31 has a fixed section provided with a permanent magnet (not shown), so that when the drive coil 13 is excited by the linear motor controller 17, the optical head 3 is moved in the radial direction of the optical disk 1 with the movement of the linear motor 31.

A laser beam generated from the semiconductor laser 9 under the control of a laser controller 14 is irradiated on the surface of the optical disk 1 through the collimator lens 11a, the half prism 11b and the objective lens 6. Reflection light from the disk's surface is led to the photosensor 8 through the objective lens 6, the half prism 11b, the condensing lens 10a and a cylindrical lens 10b.

The photosensor 8 comprises four photosensor cells 8a to 8d. The output signal of the photosensor cell 8a is supplied through an amplifier 12a to one ends of adders 30a and 30c, and the output signal of the photosensor cell 8b is supplied through an amplifier 12b to one ends of adders 30b and 30d. The output signal of the photosensor cell 8c is supplied through an amplifier 12c to the other ends of the adders 30b and 30c, and the output signal of the photosensor cell 8d is supplied through an amplifier 12d to the other ends of the adders 30a and 30d.

The output signal of the adder 30a is supplied to an inverted input terminal of a differential amplifier OP1 whose non-inverted input terminal is supplied with the output signal of the adder 30b. A tracking difference signal corresponding to the difference between the output signals of the adders 30a and 30b is supplied to a tracking controller 16. This controller 16 produces a track drive signal in accordance with the track difference signal from the differential amplifier OP1.

The track drive signal from the tracking controller 16 is supplied to the drive coil 4, while the track difference signal used in the controller 16 is supplied to the linear motor controller 17.

The output signal of the adder 30c is supplied to an inverted input terminal of a differential amplifier OP2 whose non-inverted input terminal is supplied with the output signal of the adder 30d. The differential amplifier OP2 produces a signal concerning the focus point corresponding to the difference between the output signals of the adders 30c and 30d, and this signal is supplied to a focusing controller 15. The output signal of the controller 15 is supplied to the drive coil 5 to thereby control the laser beam to be always focused on a target spot on the optical disk 1.

In the above focusing and tracking states, sum signals of the outputs of the individual photosensor cells 8a–8d, i.e., the output signals of the adders 30a and 30b, reflect recesses and upheavals of pits (recorded data) formed on tracks. These sum signals are supplied to a video circuit 19 which in turn reproduces image data and address data (track number, sector number, etc.).

A binary signal reproduced by the video circuit 19 is sent through an interface circuit 70 to an optical disk controller 71 serving as an external apparatus.

From the above reproduced signal, it is detected whether or not data has already been recorded, and an envelope binary signal d is output which corresponds to recorded data on the control track C.

At the time the control track C is accessed, the envelope binary signal d is sent to a CPU 23.

At this time, the CPU 23 moves the optical head 3 from the innermost track on the optical disk 1 to a position corresponding to 11.5 scales of the optical scale 25. The CPU 23 then discriminates that the optical head 3 is at the proximity of the center of the control track C and stops the optical head 3. At this time, the CPU 23 checks the high and low durations of the envelope binary signal d from a comparator 46 of the video circuit 19 to thereby read characteristic data from the control track C and controls the optical disk apparatus in accordance with the characteristic data. Accordingly, the optical disk apparatus can be controlled in accordance with various optical disks 1 having different specifications (companies).

The optical disk apparatus is provided with a D/A converter 22 which is used for data transmission between the focusing controller 15, tracking controller 16, linear motor controller 17 and CPU 23.

The tracking controller 16 moves the objective lens 6 in accordance with a track jump signal supplied through the D/A converter from the CPU 23 to move the beam by one track.

The laser controller 14, focusing controller 15, tracking controller 16, linear motor controller 17, motor controller 18 and video circuit 19 are all controlled by a program stored in a memory 24 under the control of the CPU 23 through a bus line 20.

Figure 2:
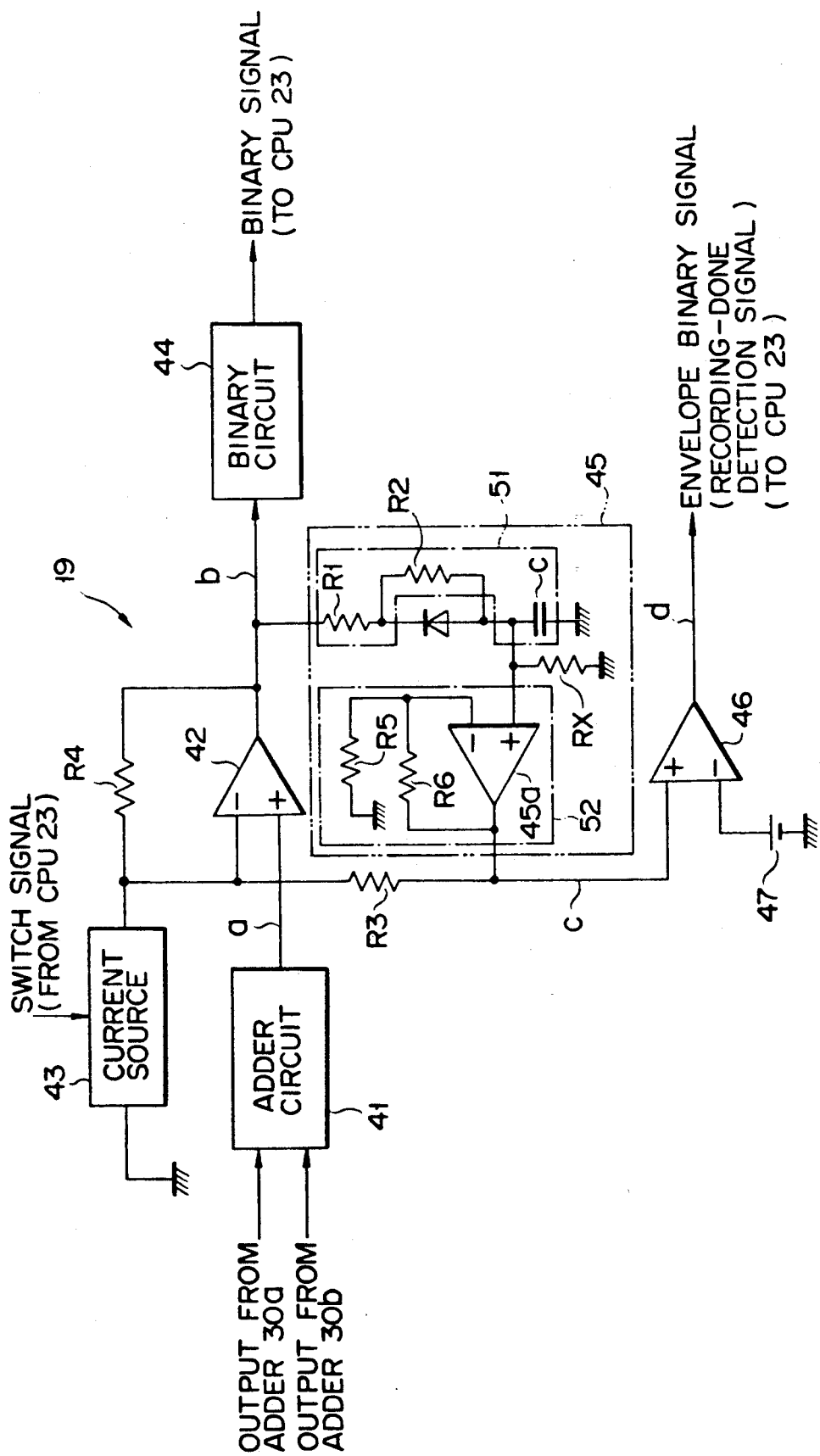
FIG. 2 is a schematic circuit diagram illustrating the arrangement of a video circuit shown in FIG. 1.

As shown in FIG. 2, the video circuit 19 comprises an adder circuit 41, an amplifier 42, resistors R3 and R4, a current source 43, a binary circuit 44, an envelope detector 45, the comparator 46, and a power source 47.

The adder circuit 41 adds the signals from the adders 30a and 30b, and the resultant reproduction signal a (FIG. 9A) is sent to a non-inverted input terminal of the amplifier 42.

The amplifier 42, constituted by an operational amplifier, amplifies the signal a, the added result, from the adder circuit 41 with an amplification factor (R3+R4)/R3 determined by the resistors R3 and R4 while being applied with a bias current from the current source 43. The amplified signal b is sent to the binary circuit 44 and envelope detector 45.

In addition, the amplifier 42 changes the lowest level of the output signal b in accordance with a detection signal c from the envelope detector 45 to thereby keep the lowest level of the output signal b at substantially constant.

The amplifier 42 is applied at its inverted input terminal with a bias current by the current source 43. The value of this bias current is changed (the operation point is changed) depending on whether reproduced data is master plate preformat data or data recorded by the present apparatus, i.e., in accordance with the difference in property of the reproduced signal.

The bias currents with different current values from the current source 43 are switched from one to the other by a switch signal (command) from the CPU 23. For instance, a high level bias current is output with respect to the master plate preformat data, and a low level bias current with respect to the recording data recorded by the present apparatus.

If switching of the bias currents is instructed by the CPU 23, therefore, even for different formats of the optical disk 1, the optical disk apparatus is controlled at the proper, corresponding switch timing.

The bias currents may be switched from one to the other at the timing when reproduction of the preformat data in one block is completed (r reproduction of the recording data is completed.

The binary circuit 44 compares the signal b from the amplifier 42 with a predetermined reference value for binary conversion. The binary signal from this binary circuit 44 is sent to the CPU 23.

The envelope detector 45 detects the lower envelope of a data component of the signal b from the amplifier 42, and the detection signal c (FIGS. 9C and 10D) is sent to the inverted input terminal of the amplifier 42. This envelope detector comprises resistors R1, R2, R5 and R6, a bias resistor Rx, a diode D, a capacitor C and an amplifier 45a.

Figure 7:
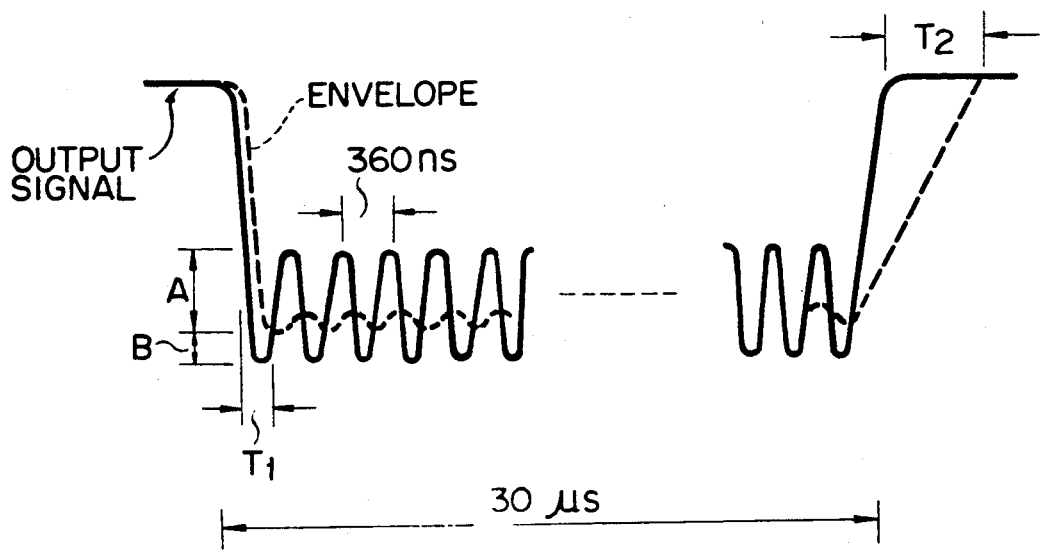
FIGS. 7 and 8 show signal waveform diagrams illustrating the relationship between a reproduction signal from the optical head and an envelope.
Figure 8:
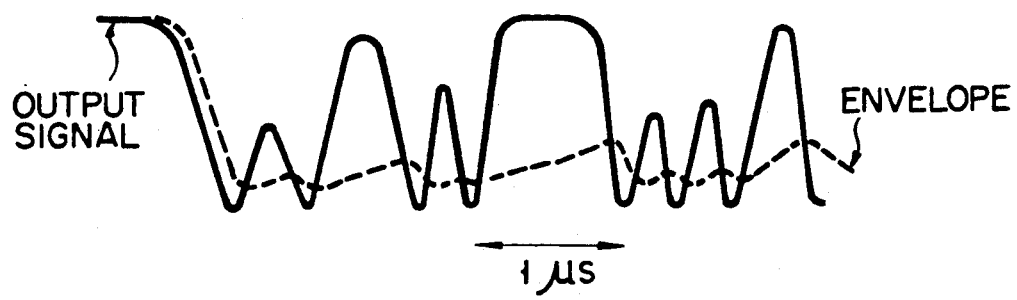

The signal b from the amplifier 42 as shown by the real lines in FIGS. 7 and 8 is integrated by an integrator 51, which comprises the resistors R1 and R2 and the capacitor C, and the result is the lower portion of the data component or the peak values of the envelope as indicated by the dotted lines in the same diagrams. In accordance with the peak values of the envelope, the level (lowest level) of the signal from the amplifier 42 is compensated for by a level compensator 52, comprising the resistors R5 and R6 and the amplifier 45a. The output of the level compensator 52 is supplied to the inverted input terminal of the amplifier 42 to change the amount of feedback to this amplifier 42. This permits the amplifier 42 to serve as an envelope servo amplifier.

The amplification factor of the amplifier 45a is $(R5+R6)/R5$.

For the optical disk 1 rotating at the speed of 1800 rpm, the frequency of a carrier signal in the control track C is about 2.78 MHz and the pulse interval is about 360 ns; a ½-bit cell is about 30 ms.

The time constant T1 for response of the lower portion of the data component of the envelope (downward response time constant) in the envelope detector 45 is expressed by $T1=R1\cdot C/\{(R5+R6/R5)\cdot(R4/R2)\}$, and the time constant T2 for response of the upper portion of this data component (upward response time constant) is expressed by $T2=(R1+R2)C/\{(R5+R6/R5)\cdot(R4/R2)\}$.

Given $T1<T2<30\ \mu s$ and $T1:T2=A:B$, therefore, the above control track C can be reproduced.

The time constant T2 should be set equal to or less than 30 ms when the optical disk 1 is driven at 1800 rpm. If the signal a from the adder circuit 41 varies as shown in FIGS. 10A and 11A, the level of data component can be maintained at constant (see FIGS. 9B, 10C and 11B) by tracking the envelope with respect to the vertical fluttering of the data component as shown in FIGS. 9C, 10D and 11C.

Figure 12A:
FIGS. 12A and 12B are diagrams illustrating the relationship between pits on tracks on the optical disk shown in FIG. 1 and a reproduction signal.
Figure 12B:
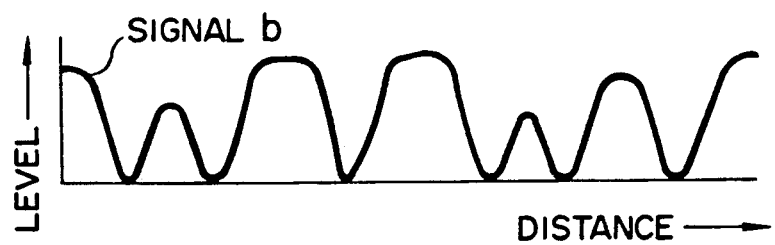

Accordingly, the reproduction signal b corresponding to reflection light from pits P formed on a track T (see FIG. 12A) of the optical disk 1 has a constant lower level corresponding to the pits P as shown in FIG. 12B.

If the level of the data component becomes too small to approach the frequency component of the reproduction signal, the envelope may not be accurately detected and the output waveform will be deformed accordingly. To prevent such deformation, given that the peak-to-peak distance of the reproduction signal is 1 $\mu s$ at most, the time constant T2 should be set lower than 1 $\mu s$ ($T2>1\ \mu s$).

Therefore, the upward response time constant T2 for the upper portion of the data component in the envelope detector 45 is greater than the rotational cycle of the optical disk 1 and is lower than the lowest frequency of the frequency component of the recording data.

If the property of the reproduction signal varies, the response speed for envelope detection can be altered by changing the values of the resistors R1 and R2 and adding the bias resistor Rx in the envelope detector 45 in accordance with an instruction from the CPU 23.

The binary signal d used as a recording-done detection signal or the envelope binary signal d corresponding to the recording data on the control track C is sent to the CPU 23 in accordance with the result of comparison of the detection output of the envelope detector 45 with the reference voltage from the power source 47 conducted by the comparator 46.

For instance, for the reproduction signal a as shown in FIGS. 9A and 10A, the envelopes as shown in FIGS. 9C and 10D are detected. The envelope detection signal c is then converted into the envelope binary signal d as shown in FIG. 9D or 10E. The CPU 23 detects a data recording state or data unrecorded state by using this envelope binary signal d. When the envelope binary signal d after the address data is "0," the data recording is detected, and when the signal d is "1," the data unrecorded state is detected.

With the above arrangement, the operation for reading the control track C will be explained below referring to the flowchart shown in FIG. 15. Assume now that a command to access the control track C is supplied to the CPU 23 from the optical disk controller 71. Then, the CPU 23 controls the linear motor controller 17 to move the optical head 3 outward from the innermost track on the optical disk 1.

When the linear motor 31 is driven by an amount corresponding to 11.5 scales by the CPU 23, i.e., when the optical head 3 comes to the vicinity of the center of the control track C, the head 3 is stopped.

Then, the CPU 23 causes the semiconductor laser 9 to generate a laser beam. This laser beam is irradiated on the optical disk 1 through the collimator lens 11a, half prism 11b and objective lens 6. The reflection light from the disk 1 is guided to the photosensor 8 through the objective lens 6, half prism 11b, condensing lens 10a and cylindrical lens 10b.

The output signal of the photosensor cell 8a of the photosensor 8 is supplied through the amplifier 12a to the one ends of the adders 30a and 30c. The output signal of the photosensor cell 8b is supplied through the amplifier 12b to one ends of the adders 30b and 30d. The output signal of the photosensor cell 8c is supplied through the amplifier 12c to the other ends of the adders 30b and 30c. The output signal of the photosensor cell 8d is supplied through the amplifier 12d to the other ends of the adders 30a and 30d.

In the above state, the signals from the adders 30a and 30b are supplied to the adder circuit 41, which sends out the reproduction signal a (FIGS. 9A, 10A and 11A), corresponding to the sum of the detection signals of the photosensor cells 8a-8d, to the amplifier 42.

The reproduction signal a indicates the signal quantity of 1 (see FIG. 9A or 10A) when no data has been recorded, and has a waveform corresponding to the pits in the downward direction in the same diagrams, such as 1' (reproduction signal corresponding to the master plate preformat data) or 1" (reproduction signal corresponding to recording data recorded by the present apparatus) when data has been recorded. There is a signal component S whose amplitude is lower than what should be due to an uneven recording state or other defects, and the signal as a whole swells greatly due to the surface fluttering or eccentricity of the optical disk 1.

The amplifier 42 amplifies the signal a (or result of addition) from the adder circuit 41 with the amplification factor of (R3+R4)/R3 determined by the resistors R3 and R4 while being applied with the bias current from the current source 43. The amplified signal b is sent to the envelope detector 45, which detects the lower envelope of the data component of the signal b. The detection signal c (FIG. 9C or 10D) from the detector 45 is supplied to the inverted input terminal of the amplifier 42 to compensate for the level of the signal from the amplifier 42.

More specifically, the signal b from the amplifier 42 as indicated by the real line in FIG. 7 is integrated by the integrator 51 to show the peak values of the lower envelope of the data component as indicated by the dotted line in the same diagram. In accordance with the peak values of the envelope, the level of the signal from the amplifier 42 is compensated for by the level compensator 52. The output c of the level compensator 52 is supplied through the resistor R3 to the inverted input terminal of the amplifier 42 to vary the amount of feedback to this amplifier 42. Accordingly, the amplifier 42 serves as an envelope servo amplifier.

The comparator 46 of the video circuit 19 compares the envelope detection signal c from the envelope detector 45 with a predetermined reference value to convert it into a binary signal d. The envelope binary signal d is sent to the CPU 23.

The CPU 23 checks the high and low durations of the envelope binary signal d to read the characteristic data from the control track C. The CPU 23 sends this characteristic data to the optical disk controller 71. The optical disk controller 71 is controlled in accordance with the received characteristic data and various specifications (companies).

For instance, the optical disk controller 71 is controlled in accordance with the characteristic (reflection factor) of the recording film of the optical disk 1, the powers of the semiconductor laser for data recording and reproduction, the format (the number of sectors per track), etc.

As described above, the lower envelope of the data component in the output b of the amplifier 42, which amplifies the reproduction signal a, is detected and the envelope detection signal c is added with the output of the adder circuit 41 in the amplifier 42. Consequently, the lower portion of the data component of the output b of the amplifier 42, or the lowest level of the signal b, is kept constant, and the envelope detection signal c with a constant level is subjected to binary conversion to thereby reproduce the accurate envelope binary signal d.

Accordingly, the characteristic data of the control track C is read out.

According to the above embodiment, the envelope binary circuit 46 for converting the envelope from the envelope detector 45 into a binary signal uses a single comparator 41. However, this embodiment is not restricted to this particular design, and the binary conversion may be carried out by supplying the signal c through such a circuit as shown in FIG. 13 that comprises resistors R11-R14, a diode D, a capacitor C1 and an amplifier A4 has the opposite characteristic to the detection characteristic of the envelope detector 45, and subjecting the resultant signal to AC-coupling by a capacitor C2 before binary conversion in a comparator A5. In this case, with respect to the envelope detection signal c shown in FIG. 14A, the signal e as shown in FIG. 14B would be attained as the output of the amplifier A4 and the envelope binary signal g as shown in FIG. 14C would be output from the comparator A5.

This can ensure accurate detection of the duty ratio of the control track C and can provide an envelope binary signal with symmetrical waveform so that this binary signal can be used as it is as control track data.

The reproduction operation will be explained below referring to the flowchart shown in FIG. 16. Assume now that a command to access a specific track for data reproduction is supplied to the CPU 23 from the optical disk controller 71. Then, the CPU 23 controls the linear motor controller 17 to move the optical head 3 to the target track.

Then, the CPU 23 causes the semiconductor laser 9 to generate a laser beam. This laser beam is irradiated on the optical disk 1 through the collimator lens 11a, half prism 11b and objective lens 6. The reflection light from the disk 1 is guided to the photosensor 8 through the objective lens 6, half prism 11b, condensing lens 10a and cylindrical lens 10b.

The output signal of the photosensor cell 8a of the photosensor 8 is supplied through the amplifier 12a to the one ends of the adders 30a and 30c. The output signal of the photosensor cell 8b is supplied through the amplifier 12b to one ends of the adders 30b and 30d. The output signal of the photosensor cell 8c is supplied through the amplifier 12c to the other ends of the adders 30b and 30c. The output signal of the photosensor cell 8d is supplied through the amplifier 12d to the other ends of the adders 30a and 30d.

In the above state, the signals from the adders 30a and 30b are supplied to the adder circuit 41, which sends out the reproduction signal a (FIGS. 9A and 10A), corresponding to the sum of the detection signals of the photosensor cells 8a-8d, to the amplifier 42.

The reproduction signal indicates the signal quantity of 1 (see FIG. 9A or 10A) when no data has been recorded, and has a waveform corresponding to the pits in the downward direction in the same diagrams, such as 1' (reproduction signal corresponding to the master plate preformat data) or 1" (reproduction signal corresponding to recording data recorded by the present apparatus) when data has been recorded. There is a signal component S whose amplitude is lower than what should be due to an uneven recording state or other defects, and the signal as a whole swells greatly due to the surface fluttering or eccentricity of the optical disk 1.

The amplifier 42 amplifies the signal a (or result of addition) from the adder circuit 41 with the amplification factor of (R3+R4)/R3 determined by the resistors R3 and R4 while being applied with the high bias current from the current source 43 or with the low bias current therefrom. The amplified signal b is sent to the envelope detector 45.

In other words, as shown in FIG. 10B, a high bias current is output from the current source 40 with respect to the master plate preformat data in response to a switch signal from the CPU 23, and a low bias current is output with respect to the recording data recorded by the present apparatus.

The envelope detector 45 detects the lower envelope of the data component of the signal b. The detection signal c (FIG. 10D) from the detector 45 is supplied to the inverted input terminal of the amplifier 42 to compensate for the level of the signal from the amplifier 42.

More specifically, the signal b from the amplifier 42 as indicated by the real line in FIGS. 7 and 8 is integrated by the integrator 51 to show the peak values of the lower envelope of the data component as indicated by the dotted line in the same diagram. In accordance with the peak values of the envelope, the level of the signal from the amplifier 42 is compensated for by the level compensator 52. The output c of the level compensator 52 is supplied through the resistor R3 to the inverted input terminal of the amplifier 42 to vary the amount of feedback to this amplifier 42. Accordingly, the amplifier 42 serves as an envelope servo amplifier.

As a result, the output signal b of the amplifier 42 has its lowest level (lower portion of the data component) kept at substantially constant with respect to the master plate preformat data as well as the recording data recorded by the present apparatus. This signal with a constant level is output to the binary circuit 44.

The binary circuit 44 compares the signal b with a predetermined reference value for binary conversion, and the resultant, binary signal is output to the CPU 23. The CPU 23 then sends the binary signal as a reproduction signal to the optical disk controller 71.

As described above, even if the reproduction signal a from the adder circuit 41 has a lower amplitude than what should be due to uneven recording, etc. or if it greatly swells due to the surface fluttering, eccentricity or the like of the optical disk, the lowest level of the signal b from the amplifier 42 can be kept at constant, thus ensuring stable binary conversion and accurate signal reproduction as a consequence.

With regard to reproduction signal having different amplitudes with respect to different properties of data, the level of the output signal of the amplifier 42 can be set constant by switching the bias currents from one to the other in consideration of the amplitude difference. This ensures stable binary conversion with the same reference value (threshold value) even with respect to such different properties of data. In addition, a transient phenomena originating from the amplitude difference between the outputs of the amplifier 42 is reduced so that a more stable reproduction signal can be attained.

What is claimed is:

1. An optical disk apparatus for reproducing data from an optical disk by means of a laser beam, the optical disk having recording tracks on which preformat data and recording data are recorded, said apparatus comprising:
   optical head means for converting optical data attained by irradiating a laser beam on said optical disk into an electric signal;
   means for generating two bias currents;
   means for switching between the two bias currents from said current generator means in accordance with detection of said preformat data and said recorded data at a time of reproduction of said preformat data or said recording data;
   means for amplifying said electric signal from said optical head with an amplification factor according to that bias current which is switched by said switch means and generated from said current generator means;
   means for extracting an envelope signal in response to an amplified signal from said amplifier means;
   adder means for adding the envelope signal from said envelope signal extraction means and said electric signal from said optical head means to output an added signal; and
   means for converting the added signal from said adder means into a binary signal.

2. The apparatus according to claim 1, wherein said envelope signal extraction means comprises an integrating circuit and a level compensating circuit.

3. The apparatus according to claim 1, wherein said converter means is a comparator.

* * * * *